(12) United States Patent
Kusyk

(10) Patent No.: US 8,219,035 B2
(45) Date of Patent: *Jul. 10, 2012

(54) ENHANCED CALIBRATION FOR MULTIPLE SIGNAL PROCESSING PATHS IN A WIRELESS NETWORK

(75) Inventor: Richard Glenn Kusyk, Ottawa (CA)

(73) Assignee: Reverb Networks, Inc., Ashburn, VA (US)

( * ) Notice: Subject to any disclaimer, the term of this patent is extended or adjusted under 35 U.S.C. 154(b) by 363 days.

This patent is subject to a terminal disclaimer.

(21) Appl. No.: 12/562,378

(22) Filed: Sep. 18, 2009

(65) Prior Publication Data

US 2011/0068971 A1 Mar. 24, 2011

(51) Int. Cl.
*H04B 17/00* (2006.01)

(52) U.S. Cl. ............... 455/67.11; 455/67.14; 455/67.16; 455/115.1; 455/115.2

(58) Field of Classification Search ............... 455/67.11, 455/67.14, 67.16, 115.1, 115.2, 226.1, 226.3
See application file for complete search history.

(56) References Cited

U.S. PATENT DOCUMENTS

| | | | |
|---|---|---|---|
| 5,155,590 A | 10/1992 | Beyers, II et al. | |
| 5,617,101 A * | 4/1997 | Maine et al. | 342/358 |
| 6,124,824 A | 9/2000 | Xu et al. | |
| 6,195,045 B1 | 2/2001 | Xu et al. | |
| 6,208,287 B1 | 3/2001 | Sikina et al. | |
| 6,600,445 B2 | 7/2003 | Li | |
| 6,690,952 B2 | 2/2004 | Nishimori et al. | |
| 6,747,594 B2 | 6/2004 | Lindskog et al. | |
| 6,765,529 B2 | 7/2004 | Doi et al. | |
| 7,003,310 B1 | 2/2006 | Youssefmir et al. | |
| 7,043,199 B2 | 5/2006 | Dai et al. | |
| 7,098,847 B2 | 8/2006 | Li | |
| 7,359,734 B2 | 4/2008 | Ylitalo | |

(Continued)

FOREIGN PATENT DOCUMENTS

EP 1 513 271 3/2005

(Continued)

OTHER PUBLICATIONS

International Search Report dated Sep. 21, 2010 in International (PCT) Application No. PCT/US2010/40573.

(Continued)

*Primary Examiner* — Tuan Pham

(57) ABSTRACT

Calibrating signal processing paths for a plurality of transmission devices by obtaining calibration data for at least one of the signal processing paths for each of the transmission devices and determining a plurality of calibration weights from the calibration data for each of the transmission devices. A calibration variance is calculated between the plurality of calibration weights and it is determined if the calibration variance is below a calibration variance threshold. Additionally, a phase variation and a magnitude variation are calculated from the calibration data for each of the transmission devices with respect to a reference transmission signal obtained from a reference transmission device and it is determined for each of the transmission devices if the phase variation is below a phase variation threshold and if the magnitude variation is below a magnitude variation threshold. Further, if the calibration variance is below the calibration variance threshold, and the phase variation is below the phase variation threshold and the magnitude variation is below the magnitude variation threshold for each of the transmission devices, then the plurality of calibration weights are applied to the at least one of the signal processing paths of each of the transmission devices.

26 Claims, 7 Drawing Sheets

U.S. PATENT DOCUMENTS

| | | | |
|---|---|---|---|
| 2004/0120411 A1 | 6/2004 | Walton et al. | |
| 2004/0266483 A1 | 12/2004 | Choi | |
| 2006/0019712 A1 | 1/2006 | Choi | |
| 2006/0232332 A1* | 10/2006 | Braithwaite | 330/149 |
| 2007/0109995 A1 | 5/2007 | Quigley et al. | |
| 2007/0249404 A1 | 10/2007 | Gao et al. | |
| 2007/0298733 A1 | 12/2007 | Cole et al. | |
| 2008/0090531 A1 | 4/2008 | Jungerman et al. | |
| 2010/0013709 A1 | 1/2010 | Schlee et al. | |
| 2011/0022904 A1* | 1/2011 | Zopf et al. | 714/704 |
| 2011/0095944 A1* | 4/2011 | Kusyk | 342/368 |

FOREIGN PATENT DOCUMENTS

| | | |
|---|---|---|
| WO | 2008/009421 A1 | 1/2008 |

OTHER PUBLICATIONS

International Search Report issued Nov. 15, 2010 in International (PCT) Application No. PCT/US2010/049083.

U.S. Office Action mailed Aug. 5, 2011 for U.S. Appl. No. 12/603,907, filed Oct. 22, 2009.

* cited by examiner

ENHANCED CALIBRATION FOR MULTIPLE SIGNAL PROCESSING PATHS IN A WIRELESS NETWORK

BACKGROUND OF THE INVENTION

1. Field of the Invention

The present invention relates generally to the field of signal processing, and more specifically to calibration of multiple signal processing paths within a wireless network.

2. Description of the Related Art

A signal processing system, in for example a Time Division Duplex ("TDD") system, includes a plurality of signal processing paths and requires a suitable mechanism to match characteristics of the individual signal processing paths to each other within a given pre-specified tolerance. Each of the signal processing paths also includes a transmitter (Tx) and/or a receiver (Rx) or an electrical/electronic/optical measurement system that allows an information/measurement signal with or without modulating a carrier to be processed through it. It is necessary for the plurality of processing paths to have electrical parameters of, for example, magnitude, phase and bulk delay through the individual processing paths to match each other within an acceptable tolerance, which may be different for the different processing paths.

Beamforming is a general signal processing technique used to control the directionality of the reception or transmission of a signal on a transducer array. Using beamforming, the majority of signal energy can be transmitted from a group of transducers (such as radio antennas) in a chosen angular direction. The present invention discloses a beamforming calibration system for use in a TDD system for matching characteristics of the individual signal processing paths to each other within a given pre-specified tolerance.

SUMMARY OF THE INVENTION

An embodiment of the invention relates to a method of calibrating signal processing paths for a plurality of transmission devices. The method includes obtaining calibration data for at least one of the signal processing paths for each of the transmission devices and determining a plurality of calibration weights from the calibration data for each of the transmission devices. A calibration variance is calculated between the plurality of calibration weights and it is determined if the calibration variance is below a calibration variance threshold. Additionally, a phase variation and a magnitude variation are calculated from the calibration data for each of the transmission devices with respect to a reference transmission signal obtained from a reference transmission device and it is determined for each of the transmission devices if the phase variation is below a phase variation threshold and if the magnitude variation is below a magnitude variation threshold. Further, if the calibration variance is below the calibration variance threshold, and the phase variation is below the phase variation threshold and the magnitude variation is below the magnitude variation threshold for each of the transmission devices, then the plurality of calibration weights are applied to at least one of the signal processing paths of each of the transmission devices.

DETAILED DESCRIPTION OF THE INVENTION

Figure 1:
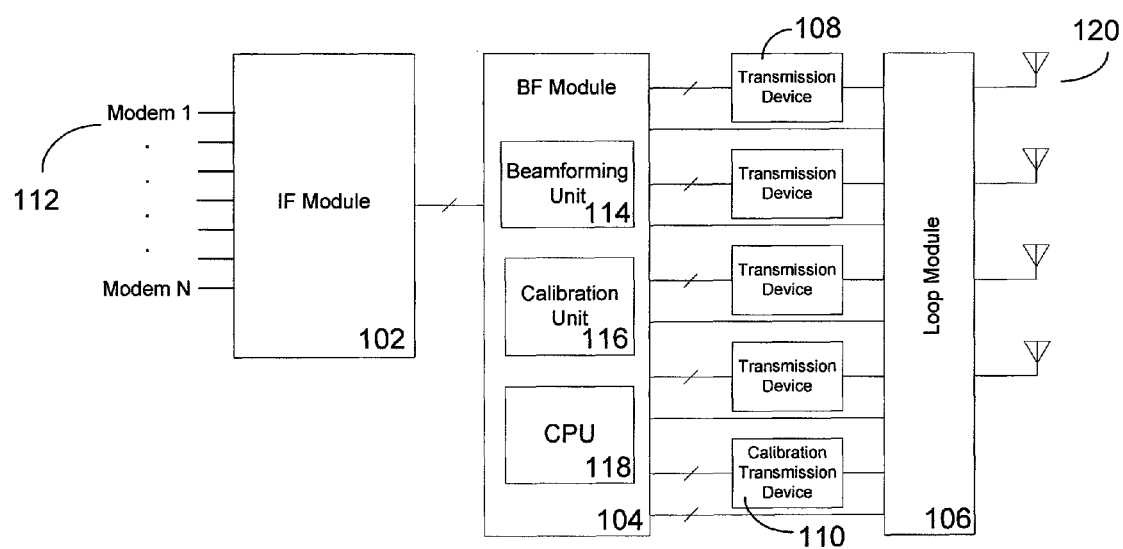
FIG. 1 is a block diagram illustrating an exemplary calibration system in accordance with an embodiment of the present invention.

FIG. 1 illustrates an exemplary system for carrying out an embodiment of the present invention. Broadly, the system includes an interface (IF) module 102, a beamforming (BF) module 104, two or more transmission devices 108, a loop module 106, and two or more antennas 120.

The IF module 102 is used to interconnect the system with one or more modems 112. Each type of modem will require a unique IF module 102 that is specifically designed to handle the unique interface and signaling requirements. The modems 112 are able to control the signal processing paths of the transmission devices 108. The signal processing paths include both the Tx power output and Rx gain of the transmission devices 108. Because the transmission devices 108 are used to carry signals from all the modems 112 simultaneously, control of the Tx power output and Rx gain cannot be accomplished by adjusting each transmission device output power and gain control. Instead, each of the transmission devices 108 is set to maximum Tx power and maximum Rx gain, and beamforming weights are applied to the system to obtain precise Tx power output control and Rx gain control for each transmission device 108. Ideal beamforming weights are transmitted from the modems 112 to the IF module 102. The IF module 102 is used to up-convert and down-convert signals from the modems 112 into a 30 MHz bandwidth that is used by the system and then the signals, including the ideal beamforming weights, are transmitted to the BF module 104.

The BF module 104 is used to perform the main beamforming function including the calibration of the transmission devices 108. The BF module includes a beamforming unit 114, a calibration unit 116, and a central processing unit (CPU) 118.

The BF module 104 performs the multiply-accumulate functions necessary to control the Tx power output and Rx gain control of each of the transmission devices 108. In the downlink direction, the BF module communicates with the modems 112 via the IF module 102 by means of 16-bit digital IF signal running at 60 MSamples/s. This digital signal is digitally down-converted to produce a baseband 32-bit i and q signal. This baseband 32-bit i and q signal is fed into the beamforming unit to produce a 32 bit i and q signal for each of the transmission devices 108. These 32 bit i and q signals are sent out of the BF module 104 to the transmission devices 108 at a rate of 60 MSamples/s.

In the uplink direction, the BF module 104 receives 32-bit i and q signals from each of the transmission devices 108. These signals are fed into the beamforming unit 114 and will produce a 32 bit i and q signal for each of the modems 112. The signals are then digitally up-converted producing a 16-bit IF signal at 60 MSamples/s that is sent to modems 112 via the IF module 102.

A calibration signal is created in the calibration unit 116. The calibration signal is used to create an in-band signal used for calibration of delays through the transmission devices 108. Received calibration data is obtained by passing a reference calibration signal through each of the transmission devices 108 and looped back to the calibration transmission device 110 by the loop module 106 and transferred back to the BF module 104. The received calibration data is processed by the CPU 118 to ensure the received calibration data is of good quality and to create calibration weights before the received calibration data and the calibration weights are stored in the calibration unit. After calibration weights are obtained, the beamforming unit 114 creates beamforming weights by combining the ideal beamforming weights with the calibration weights and the beamforming unit 114 applies the beamforming weights to the system.

Two or more transmission devices 108 are present in the system. FIG. 1 depicts the system as having four transmission devices 108 though it should be readily understood that any number of two or more transmission devices 108 may be used. The transmission devices 108 provide the Time Division Duplex (TDD) channels used for beamforming and a calibration device 110 provides an additional channel used for calibration by sending and receiving a calibration signal that can be used to measure the differences between the transmission devices 108.

In TDD systems, the transmitter and receiver operate at the same frequency. Signals transmitted and received in a TDD system are not continuous in time. When a WiMAX signal is transmitted to an antenna, this time interval is referred to as the downlink subframe. When a WiMAX signal is received from the antenna, this time interval is referred to as the uplink subframe. Between transmit and receive intervals, gaps are defined by the WiMAX standard. The time gap occurring after the downlink subframe, but before the uplink subframe, is referred to as the TTG Gap. The time gap occurring after the uplink subframe, but before a subsequent downlink subframe, is referred to as the RTG Gap. The combination of the downlink subframe, the TTG Gap, the uplink subframe and the RTG Gap makes up one TDD period.

The loop module 106 is used to control whether the signals received from the transmission devices 108 are looped to the calibration device 110 or transmitted to the antennas 120. The BF module 104 uses an ant/cal signal 208 to control the loop module 106 to transmit or loop the transmission signals. Additionally, the BF module uses a calsel signal 210 to control the loop module 106 to determine which transmission device's signal is looped to the calibration device 110. The loop module 106 must be carefully designed so as not to significantly impact differential phases of the multiple phase paths.

Figure 2:
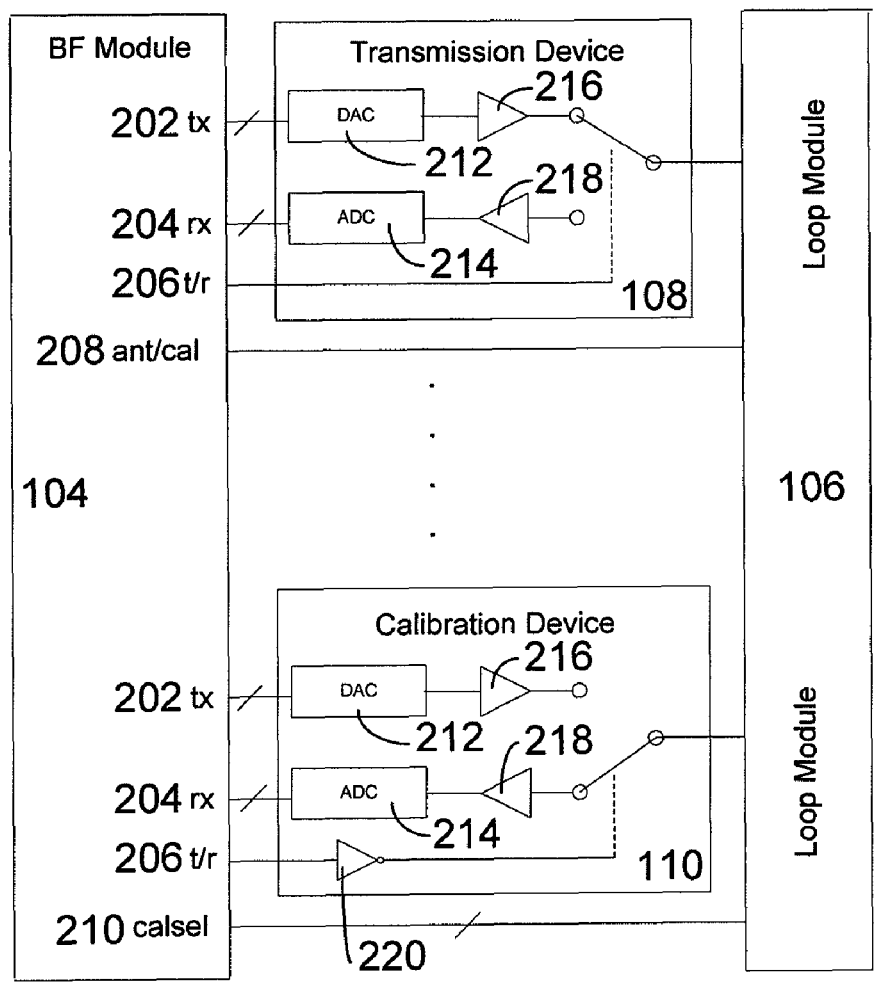
FIG. 2 is a block diagram illustrating the detail of the transmission devices and their interconnections with a beamforming module and a loop module in accordance with an embodiment of the present invention.

Referring now to FIG. 2, FIG. 2 is a block diagram illustrating the transmission devices 108 and the calibration device 110. Along the Tx path 202, the transmission devices 108 and calibration device 110 have a digital-to-analog (DAC) converter 212 to convert digital baseband i and q signals to radio frequency (RF) signals at a specified RF frequency. The RF signals are fed into an amplifier 216 and then transmitted to the loop module 106. Conversely along the Rx path, RF signals received from the loop module 106 are passed through an amplifier 218 and then an analog-to-digital (ADC) converter 214 to convert the RF signals to digital baseband i and q signals before being transmitted to the BF module 104.

Each transmission device 108 and the calibration device 110 has a t/r signal 206 used to control whether the Tx/Rx path is transmitted to/received from the loop module 106. Additionally, the t/r signal 206 of the calibration device 110 is inverted by an inverter 220 so that the t/r signal 206 of the calibration device 110 will be opposite that of the transmission devices 108, i.e., when the transmission devices 108 are set to transmit along the Tx path (t/r set to low), the calibration device 110 is set to receive from the Rx path (t/r set to high).

The ant/cal signal 208 used to control the destination of the transmitted RF signals. If the ant/cal signal 208 is set to low, the RF signals of the transmission devices 108 are to be transmitted to the antennas 120. If the ant/cal signal 208 is set to high, the RF signals of the transmission devices 108 are to be looped via the loop module 106, with the RF signals from one of the transmission devices 108 to be received by the calibration device 110. A calsel signal 210 is used by the loop module 106 to select the RF signals from one of the transmission devices 108 to be received by the calibration device 110.

Figure 3:
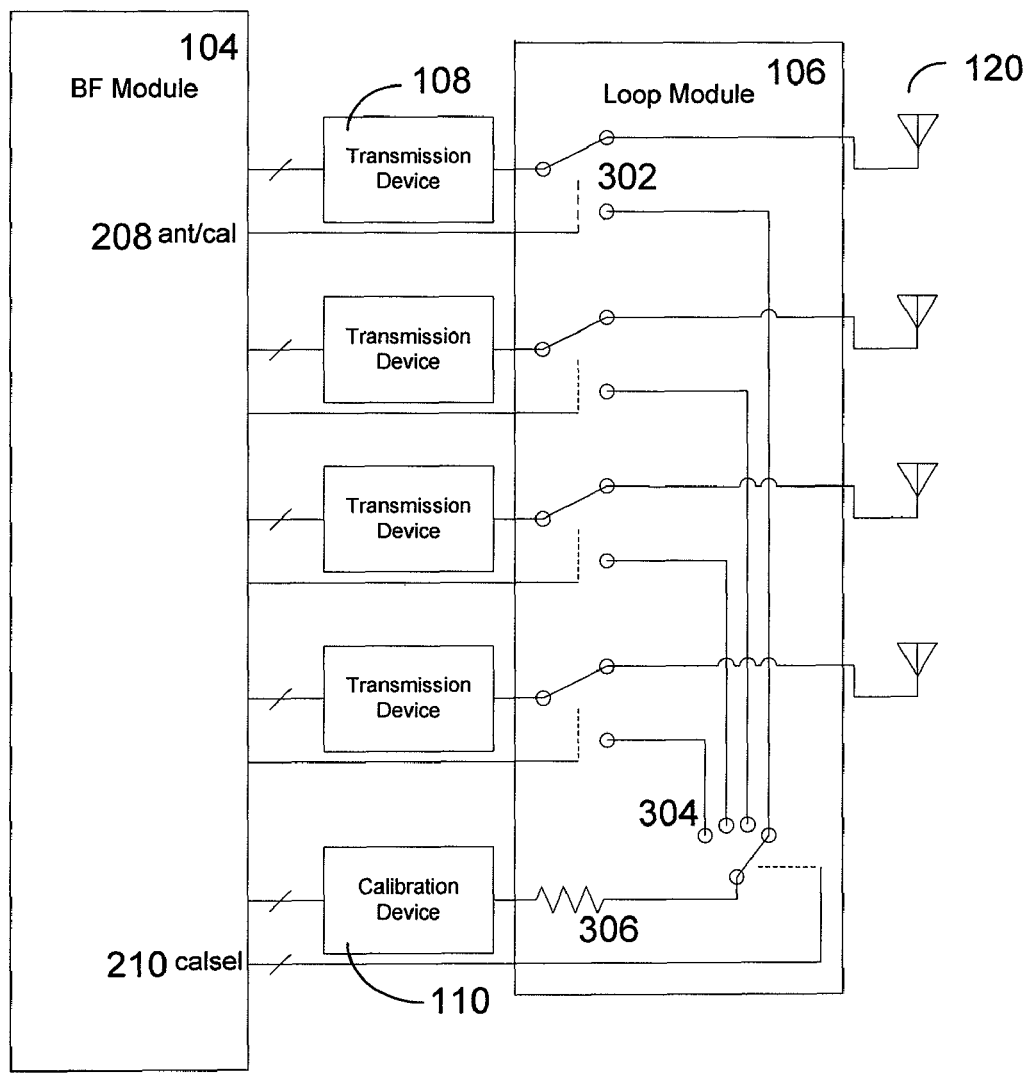
FIG. 3 is a block diagram illustrating the detail of the loop module and its interconnections with a beamforming module and two or more transmission devices in accordance with an embodiment of the present invention.

Referring now to FIG. 3, FIG. 3 is a block diagram illustrating the interconnections between the BF module 104, the transmission devices 108, the calibration device 110, the loop module 106, and the antennas 120. For each of the transmission devices 108, the loop module 106 has a switch 302 controlled by an ant/cal signal 208 for controlling the destination of the RF signals. The loop module 106 also has a switch 304 controlled by the calsel signal 210 that controls which transmission device's RF signals are looped back to the calibration device 110. An attenuator 306 is disposed between the calibration device 306 and the switch 304.

Figure 4:
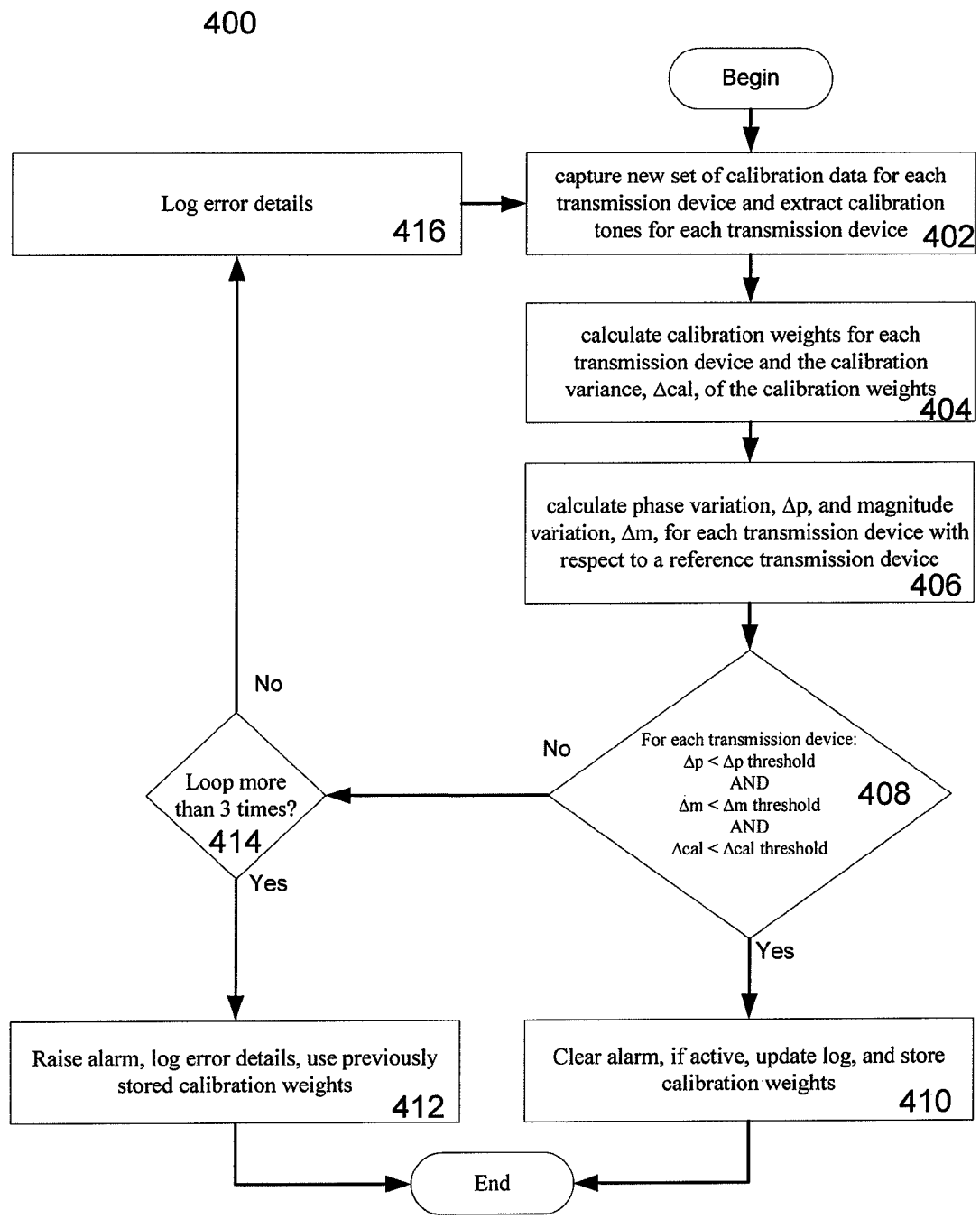
FIG. 4 is a flowchart illustrating a method of calibrating signal processing paths in accordance with an embodiment of the present invention.

Referring now to FIG. 4, FIG. 4 is a flowchart illustrating a method of calibrating signal processing paths according to one embodiment of the present invention.

In Step 402, a new set of calibration data is obtained for each of the transmission devices 108 and calibration tones are extracted for each of the transmission devices 108. The obtaining of calibration data will be described in more detail with reference to FIG. 6 below. Calibration tones for a given transmission device are obtained by dividing the tones from a calibration signal for a references transmission device by the respective tones from a calibration signal for the given transmission device. The reference transmission device may be any one of the transmission devices 108.

In Step 404, calibration weights are calculated for each of the transmission devices 108 and a calibration variance, $\Delta$cal, is determined for the calibration weights across all the transmission devices 108. The calibration weight for each of the transmission devices 108 is calculated by finding the average of the calibration tones for that transmission device. The calibration variance is the variation of the calibration weights across all the transmission devices 108 calculated in dB.

In Step 406, a phase variation, $\Delta$p, and a magnitude variation, $\Delta$m, are calculated for each of the transmission devices 108 with respect to the reference transmission device. In order to calculate the phase variation, $\Delta$p, the variation in phase over the frequency band must be first normalized. Normalization is obtained by finding the phase difference between each of the calibration tones and a reference calibration tone selected from among the calibration tones. For example, if there are six calibration tones, [A, B, C, D, E, F], and tone A is selected as the reference calibration tone, the phase difference between tones A and A, A and B, A and C, . . . , A and F are calculated to produce a set of phase differences, $[\theta_{AA}, \theta_{AB}, \theta_{AC}, \theta_{AD}, \theta_{AE}, \theta_{AF}]$. The phase difference between two calibration tones is simply the cross product of the two calibration tones. For example, if one calibration tone, A, is represented by the complex vector a, and another calibration tone, B, is represented by the complex vector b, the phase difference between the calibration tones is found by applying Equation (1).

$$\theta_{ab} = \arcsin\left(\frac{a \times b}{|a| \cdot |b|}\right)$$

$$= \arcsin\left(\frac{\text{Im}(a) \cdot \text{Re}(b) - \text{Re}(a) \cdot \text{Im}(b)}{|a| \cdot |b|}\right)$$

Equation (1)

The phase difference is calculated for each calibration tone with respect to the reference calibration tone selected from among the calibration tones. Note, that the phase difference between the reference calibration tone and itself will always be zero, i.e. $\theta_{AA}=0$. Once the variation in phases over the frequency band has been normalized, the phase variation calculated by taking the maximum phase difference minus the minimum phase difference and multiplying the result by $180/\pi$. Equation (2) illustrates the calculation.

$$\Delta_p = \frac{180}{\pi} \cdot \left(\begin{array}{c}\max(PhaseDifference) - \\ \min(PhaseDifference)\end{array}\right)$$

Equation (2)

The magnitude variation, $\Delta m$, is simply the variation of the absolute values of the calibration tones for that transmission device.

In Step 408, the calibration variance is compared to a calibration threshold, and, for each of the transmission devices 108, the phase variation is compared to a phase variation threshold and the magnitude variation is compared to a magnitude variation threshold. If the calibration variance is below the calibration threshold, and, for each of the transmission devices 108, the phase variation is below the phase variation threshold and the magnitude variation is below the magnitude variation threshold, then the method proceeds to Step 410; if not, the method proceeds to Step 414. Examples of threshold values include a phase variation threshold of 5 degrees, a magnitude variation threshold of 0.5 dB, and a calibration variance threshold of 1 dB. Note that, however, the present invention is not limited to these values and other threshold values may be used based on the specific needs of a system.

In Step 410, any active alarms are cleared, a log is updated, and the calibration weights are stored in the calibration unit 116. In Step 414, it is checked if the process flow has been looped more than 3 times. If the process has not been looped more than 3 times, the method proceeds to Step 416 and error details are logged before proceeding back to Step 402. If the process has been looped more than 3 times, the method proceeds to Step 412, at which an alarm is activated, the error details are logged, and previously determined calibration weights stored in the calibration unit 116 are used by the system.

Figure 5:
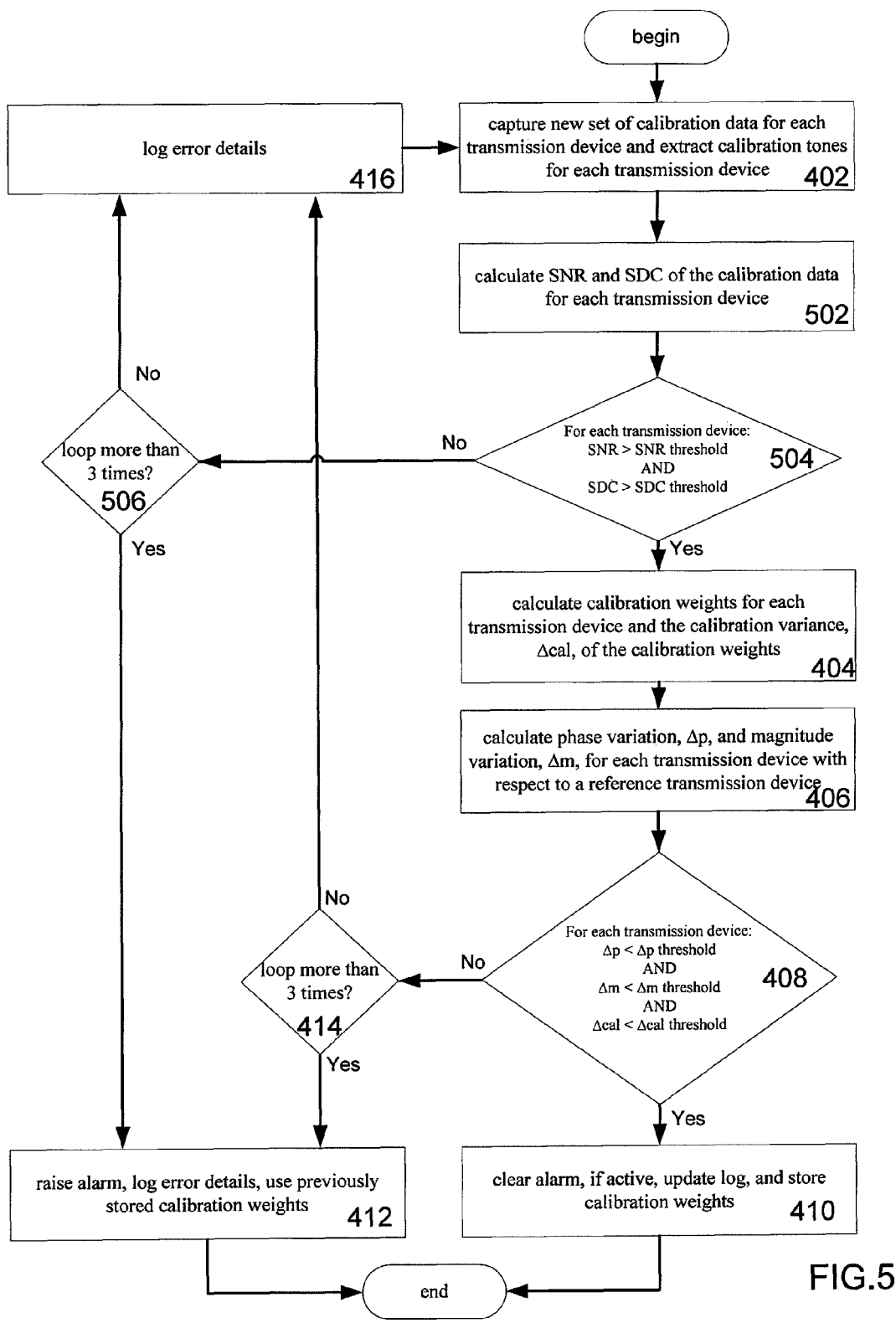
FIG. 5 is a flowchart illustrating a method of calibrating signal processing paths in accordance with an embodiment of the present invention.

Referring now to FIG. 5, FIG. 5 is a flowchart illustrating a method of calibrating signal processing paths according to a second embodiment of the present invention. More specifically, FIG. 5 illustrates an embodiment in which a signal-to-noise ratio ("SNR") and a signal-to-DC ratio ("SDC") are calculated and used to determine if the received calibration data is of good quality. For example, in order to achieve a +/−1 deg accuracy on the calibration results, the SNR should be at least 35 dB. The SDC value is used to confirm that the Quadrature Modulation Compensation ("QMC") of the transmitters is functioning properly, and the SDC should be at least 25 dB.

It should be noted that the method of calibration of FIG. 5 is similar to the method of calibration of FIG. 4 except the method of calibration of FIG. 5 includes additional steps of calculation of the SNR and the SDC of the received calibration data, and comparison of the SNR and SDC to predetermined thresholds to determine if the received calibration data is of good quality. Identical steps described above in reference to FIG. 4 will not be described below.

In Step 502, the SNR and the SDC is calculated for each of the transmission devices 108. Equation (3) is used to calculate the SNR of the received calibration data, where $I_i$ and $Q_i$ are Fast Fourier Transform ("FFT") results of the received calibration data, $N_{FFT}$ is the size of the FFT, $N_T$ is the number of tones used and T is the set of tones.

$$SNR = \frac{\sum_{i \in T}(I_i^2 + Q_i^2)}{\sum_{i=2, i \notin T}^{N_{FFT}}(I_i^2 + Q_i^2)} \cdot \frac{N_{FFT} - N_T - 1}{N_T} - 1$$

Equation (3)

Equation (4) is used to calculate the SDC of the received calibration signal, where $I_i$ and $Q_i$ are FFT results of the received calibration data, $N_{FFT}$ is the size of the FFT, $N_T$ is the number of tones used and T is the set of tones.

$$SDC = \left(\frac{\sum_{i \in T}(I_i^2 + Q_i^2)}{N_T} - \frac{\sum_{i=2, i \notin T}^{N_{FFT}}(I_i^2 + Q_i^2)}{N_{FFT} - N_T - 1}\right) \cdot \left(\frac{1}{I_1^2 + Q_1^2}\right)$$

Equation (4)

In Step 504, for each transmission of the devices 108, the SNR is compared to a SNR threshold, and the SDC is compared to a SDC threshold. As noted above, ideally the SNR should be greater than 35 dB and the SDC should be greater than 25 dB to judge that the received calibration data is of good quality, therefore the SNR threshold is set to 35 dB and the SDC threshold is set to 25 dB. Please note, however, that while 35 dB and 25 dB are used as the SNR threshold and the SDC threshold, respectively, the present invention is not limited to these values and other threshold values may be used to determine if the received calibration data is of good quality based on the specific needs of a system.

If, for each of the transmission devices 108, the SNR is greater than the SNR threshold, and the SDC is greater than the SDC threshold, the received calibration data are judged to be of good quality and the method proceeds to Step 404. However, if the received calibration is not judged to be of good quality, the method proceeds to Step 506.

In Step 506, it is checked if the process flow has been looped more than 3 times. If the process has not been looped more than 3 times, the method proceeds to Step 416 and error details are logged before proceeding back to Step 402. If the process has been looped more than 3 times, the method proceeds to Step 412 at which an alarm is activated, the error details are logged, and previously determined calibration weights are applied to the signal processing paths.

Figure 6:
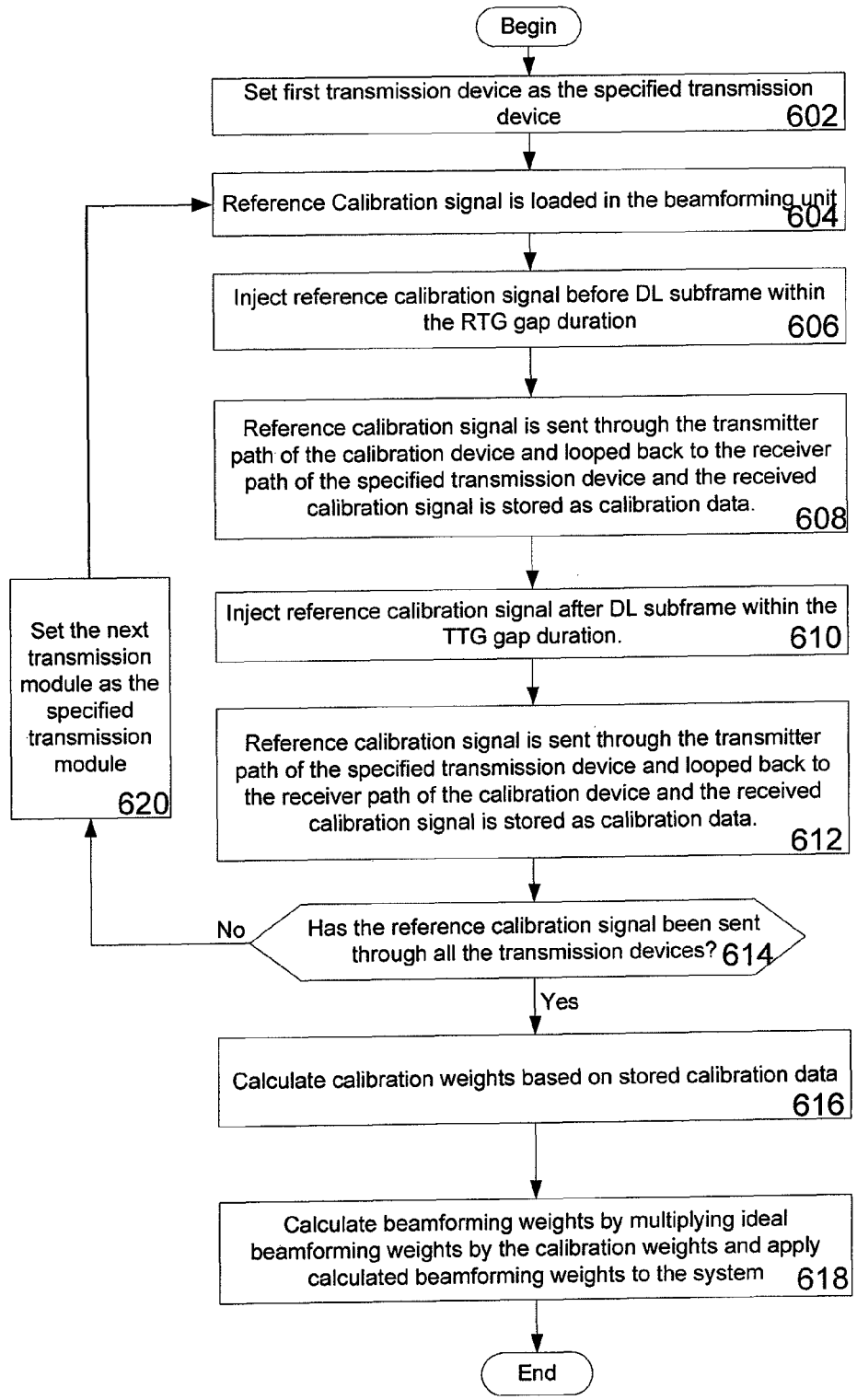
FIG. 6 is a flowchart illustrating a method of obtaining of calibration data from each of two or more transmission devices in accordance with an embodiment of the present invention.

Referring now to FIG. 6, FIG. 6 illustrates a flowchart describing a method of obtaining of calibration data from each of the transmission devices 108. Beamforming requires the accurate control of the phase and amplitude of the signals to and from the antennas 120. In order to achieve this accuracy, the transmission devices 108 are calibrated so that the differences in phase and amplitude between them can be compensated for. The calibration device 110 is used to send and receive a reference calibration signal that can be used to measure the differences between the active radios.

The reference calibration signal is transmitted and received during the intervals when the system is neither transmitting nor receiving a WiMAX signal, i.e. during the TTG Gap or the RTG Gap. This ensures that the reference calibration signal does not interfere with the WiMAX signal and that the WiMAX signal does not interfere with the calibration signal. 300 samples of the reference calibration signal are transmitted, however calculations are only done on the middle 256 received samples. This is done to avoid any discontinuities in the received 256 samples.

The reference calibration signal is simply a sum of tones that are chosen to cover the bandwidth of the system. Additionally, the tones are chosen to avoid $3^{rd}$ order inter-modulation products that would interfere with the reference calibration signal.

In Step 602, one of the transmission devices 108 is set as a specified transmission device.

In Step 604, the reference calibration signal is generated by the calibration unit 116 and loaded into the beamforming unit 114.

In Step 606, the reference calibration signal is injected before the downlink subframe within the RTG gap duration so that useful WiMAX signals and the reference calibration signal are orthogonal to one another.

In Step 608, the reference calibration signal is sent through the Tx path of the calibration device 110 and looped back to the Rx path of the specified transmission device. The signal received by the specified transmission device is stored as calibration data in the calibration unit 116 for the specified transmission device.

In Step 610, the calibration signal is injected before the downlink subframe within the TTG gap duration.

In Step 612, the reference calibration signal is sent through the Tx path of the specified transmission device 108 and looped back to the Rx path of the calibration device 110. The signal received by the calibration device 110 is stored as calibration data in the calibration unit 116 for the specified transmission device.

In Step 614, the method checks to see if the reference calibration signal has been sent through all the transmission devices 108. If not, in Step 620, a next transmission device is set as the specified transmission device and the method returns to Step 604. If the reference calibration signal has been sent through all the transmission devices 108, in Step 616, the CPU 118 calculates calibration weights for each of the transmission devices 108 based on the respective stored calibration data in the calibration unit 116.

In Step 618, the beamforming unit 114 determines beamforming weights by multiplying ideal beamforming weights received from the modems 112 by the calculated calibration weights stored in the calibration unit 116. The beamforming weights are applied to the Tx/Rx paths by the BF module 104.

It should be noted that the calibration process should be performed in a manner such that it is robust to single failures of any one Tx and/or Rx chain. The process should be able to identify which chain, if any, has failed. Additionally, a failed transmission device should not be used as a reference transmission device and the SNR and the SDC should not be checked for a failed transmission device.

Figure 7:
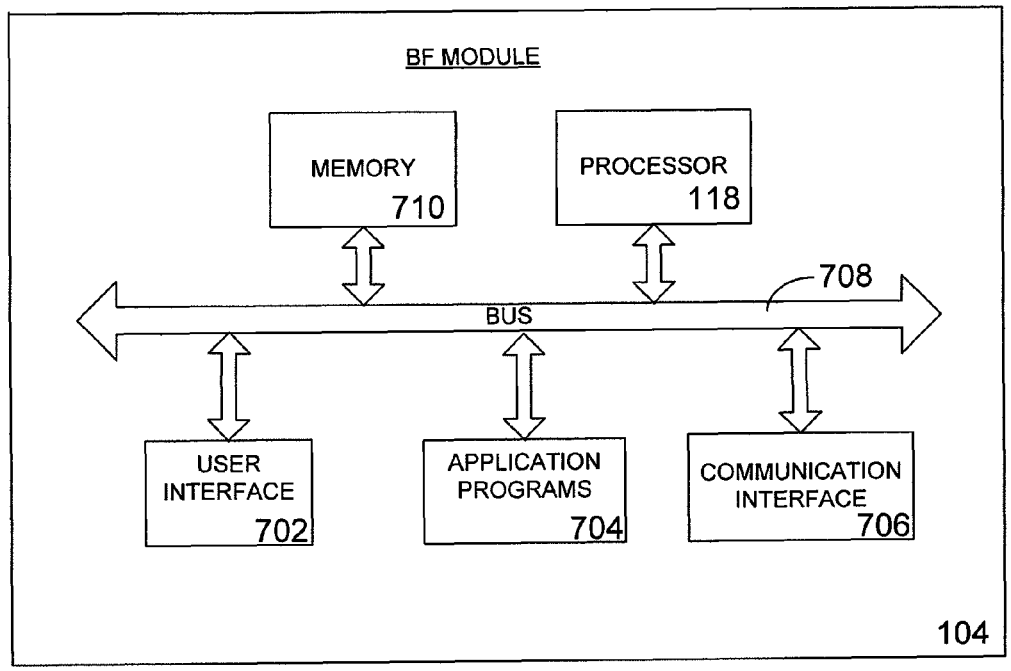
FIG. 7 is a representative beamforming module 104 for calibrating multiple signal processing networks as shown in the system of FIG. 1.

FIG. 7 is a representative BF module 104 for calibrating multiple signal processing paths as shown in the system of FIG. 1. In FIG. 7, the BF module 104 includes a memory 710, a processor 118, user interface 702, application programs 704, communication interface 706 and bus 708.

The memory 710 can be computer-readable media used to store executable instructions, computer programs, algorithms or the like thereon. The memory 710 may include a read-only memory (ROM), random access memory (RAM), programmable read-only memory (PROM), erasable programmable read-only memory (EPROM), a smart card, a subscriber identity module (SIM), or any other medium from which a computing device can read executable instructions or a computer program. The term "computer programs" is intended to encompass an executable program that exists permanently or temporarily on any computer-readable medium. The instructions, computer programs and algorithms stored in the memory 710 cause the BF module 104 to perform calibrating multiple signal processing paths as described in the system of FIG. 1. The instructions, computer programs and algorithms stored in the memory 710 are executable by one or more processors 118, which may be facilitated by one or more of the application programs 704.

The application programs 704 may also include, but are not limited to, an operating system or any special computer program that manages the relationship between application software and any suitable variety of hardware that helps to make-up a computer system or computing environment of the BF module 104. General communication between the components in the BF module 104 is provided via the bus 708.

The user interface 702 allows for interaction between a user and the BF module 104. The user interface 702 may include a keypad, a keyboard, microphone, and/or speakers. The communication interface 706 provides for two-way data communications from the BF module 104. By way of example, the communication interface 706 may be a digital subscriber line (DSL) card or modem, an integrated services digital network (ISDN) card, a cable modem, or a telephone modem to provide a data communication connection to a corresponding type of telephone line. As another example, communication interface 706 may be a local area network (LAN) card (e.g., for Ethernet™ or an Asynchronous Transfer Model (ATM) network) to provide a data communication connection to a compatible LAN.

Further, the communication interface 706 may also include peripheral interface devices, such as a Universal Serial Bus (USB) interface, a Personal Computer Memory Card International Association (PCMCIA) interface, and the like. The communication interface 706 also allows the exchange of information across one or more wireless communication networks. Such networks may include cellular or short-range, such as IEEE 802.11 wireless local area networks (WLANS). And, the exchange of information may involve the transmission of radio frequency (FR) signals through an antenna (not shown).

Further, the above disclosure defines the signal processing paths as being the Tx or Rx path of a transmission device. It is noted that the present invention is not limited to such disclosure and the above disclosure may be easily modified to work in a system containing signal processing paths consisting of an electrical/electronic/optical measurements system that allows an information/measurement signal with or without modulating a carrier to be processed through it.

While an embodiment of the invention has been disclosed, numerous modifications and changes will occur to those skilled in the art to which this invention pertains. The claims annexed to and forming a part of this specification are intended to cover all such embodiments and changes as fall within the true spirit and scope of the present invention.

The invention claimed is:

1. A method, comprising:
   obtaining calibration data for each transmission device from a plurality of transmission devices associated with a plurality of signal processing paths;
   determining a plurality of calibration weights from the calibration data for each transmission device from the plurality transmission devices;
   calculating a calibration variance between the plurality of calibration weights and determining if the calibration variance is below a calibration variance threshold;
   calculating, for each signal processing path from the plurality of signal processing paths, a phase variation and a magnitude variation from the calibration data with respect to a reference transmission signal obtained from a reference transmission device;
   determining if the phase variation is below a phase variation threshold and if the magnitude variation is below a magnitude variation threshold for each signal processing path from the plurality of signal processing paths,
   applying a calibration weight from the plurality of calibration weights to a signal processing path from the plurality of signal processing paths when the calibration variance is below the calibration variance threshold, the phase variation associated with that signal processing path is below the phase variation threshold and the magnitude variation associated with that signal processing path is below the magnitude variation threshold.

2. The method of claim 1, further comprising:
   calculating, for each signal processing path from the plurality of signal processing paths, a signal-to-noise ratio of the calibration data; and
   determining if the signal-to-noise ratio of the calibration data is below a signal-to-noise ratio threshold for each signal processing path from the plurality of signal processing paths,
   if the signal-to-noise ratio of the calibration data for any signal processing path from the plurality of signal processing paths is below the signal-to-noise ratio threshold then discarding the calibration data, and obtaining new calibration data for each transmission device from the plurality of transmission devices.

3. The method of claim 1, further comprising:
   calculating, for each signal processing path from the plurality of signal processing paths, a signal-to-DC ratio of the calibration data; and
   determining if the signal-to-DC ratio of the calibration data is below a signal-to-DC ratio threshold for each signal processing path from the plurality of signal processing paths
   if the signal-to-DC ratio of the calibration data for any signal processing path from the plurality of signal processing paths is below the signal-to-DC ratio threshold then discarding the calibration data, and obtaining new calibration data for each transmission device from the plurality of transmission devices.

4. The method of claim 1, wherein the obtaining of the calibration data includes:
   obtaining the calibration data from a transmission path associated with a signal processing path from the plurality of signal processing paths; or
   obtaining the calibration data from a receiver path associated with a signal processing path from the plurality of signal processing paths.

5. The method of calibrating of claim 4, wherein the obtaining of the calibration data from the transmission path includes:
   (i) sending a reference calibration signal through the transmission path;
   (ii) looping the reference calibration signal to a receiver path of a calibration device;
   (iii) receiving the reference calibration signal from the calibration device; and
   (iv) storing the received reference calibration signal as the calibration data.

6. The method of claim 4, wherein the obtaining of the calibration data from the receiver path includes:
   (i) sending a reference calibration signal through a transmitter path of a calibration device;
   (ii) looping the reference calibration signal to the receiver path;
   (iii) receiving the reference calibration signal from the signal processing path from the plurality of signal processing paths; and
   (iv) storing the received reference calibration signal as the calibration data.

7. The method of claim 1, further comprising:
   determining a beamforming weight for a transmission device from the plurality of transmission devices by multiplying an ideal beamforming weight by a calibration weight from the plurality of calibration weights for that transmission device from the plurality of transmission devices; and
   applying the beamforming weight for that transmission device from the plurality of transmission devices to a signal processing path from the plurality of signal processing paths associated with that transmission device from the plurality of transmission devices.

8. The method of claim 1, wherein a transmission device from the plurality of transmission devices is set as the reference transmission device.

9. A method, comprising:
   obtaining calibration data for each transmission device from a plurality of transmission devices associated with a plurality of signal processing paths;
   calculating, for each signal processing path from the plurality of signal processing paths, a signal-to-noise ratio of the calibration data and determining if the signal-to-noise ratio of the calibration data is below a signal-to-noise ratio threshold for each signal processing path from the plurality of signal processing paths;
   calculating, for each signal processing path from the plurality of signal processing paths, a signal-to-DC ratio of the calibration data and determining if the signal-to-DC ratio of the calibration data is below a signal-to-DC ratio threshold for each signal processing path from the plurality of signal processing paths;
   determining a plurality of calibration weights from the calibration data;
   calculating a calibration variance between the plurality of calibration weights and determining if the calibration variance is below a calibration variance threshold;
   calculating, for each signal processing path from the plurality of signal processing paths, a phase variation and a magnitude variation from the calibration data with respect to a reference transmission signal obtained from a reference transmission device;
   determining if the phase variation is below a phase variation threshold and if the magnitude variation is below a magnitude variation threshold for each signal processing path from the plurality of signal processing paths;

discarding the calibration data and obtaining new calibration data for each transmission device from the plurality of transmission devices if the signal-to-noise ratio of the calibration data for any signal processing path from the plurality of signal processing paths is below the signal-to-noise ratio threshold or if the signal-to-DC ratio of the calibration data for any signal processing path from the plurality of signal processing paths is below the signal-to-DC ratio threshold; and applying a calibration weight from the plurality of calibration weights to a signal processing from the plurality of signal processing paths when the calibration variance is below the calibration variance threshold, the phase variation associated with that signal processing path is below the phase variation threshold and the magnitude variation associated with that signal processing path is below the magnitude variation threshold.

10. A system, comprising:
a calibration unit configured to obtain calibration data for each transmission device from a plurality of transmission devices associated with a plurality of signal processing paths;
a calibration weight determination unit configured to determine a plurality of calibration weights from the calibration data;
a reference transmission device configured to store a reference transmission signal;
a variance calculation unit operatively coupled to the reference transmission device, the variance calculation unit configured to calculate a calibration variance between the plurality of calibration weights, and configured to calculate a phase variation and a magnitude variation from the calibration data with respect to the reference transmission signal for each signal processing path from the plurality of signal processing paths; and
a threshold determination unit configured to determine if the calibration variance is below a calibration variance threshold, and configured to determine if the phase variation for a signal processing path from the plurality of signal processing paths is below a phase variation threshold and if the magnitude variation for the signal processing path is below a magnitude variation threshold,
a calibration weight from the plurality of calibration weights being applied to the signal processing path from the plurality of signal processing paths if the calibration variance is below the calibration variance threshold, the phase variation for the signal processing path is below the phase variation threshold, and the magnitude variation for the signal processing path is below the magnitude variation threshold.

11. The system of claim 10, further comprising a signal-to-noise ratio calculating unit configured to calculate, for each signal processing path from the plurality of signal processing paths, a signal-to-noise ratio of the calibration data, and configured to determine if the signal-to-noise ratio of the calibration data is below a signal-to-noise ratio threshold for each signal processing path from the plurality of signal processing paths,
if the signal-to-noise ratio of the calibration data for any signal processing path from the plurality of signal processing paths is below the signal-to-noise ratio threshold then discarding the calibration data, the calibration data, and obtain new calibration data for each transmission device from the plurality of transmission devices.

12. The system of claim 10, further comprising
a signal-to-DC ratio calculation unit configured to calculate, for each signal processing path from the plurality of signal processing paths, a signal-to-DC ratio of the calibration data for each signal processing path from the plurality of signal processing paths, the signal-to-DC ratio calculation unit configured to determine if the signal-to-DC ratio of the calibration data is below a signal-to-DC ratio threshold for each signal processing path from the plurality of signal processing paths,
if the signal-to-DC ratio of the calibration data for any signal processing path the plurality of signal processing paths is below the signal-to-DC ratio threshold then discarding the calibration data, and obtaining new calibration data for the each transmission device from the plurality of transmission devices.

13. The system of claim 10, wherein each signal processing path from the plurality of signal processing paths includes a transmission path or a receiver path,
the calibration unit including:
a transmission calibration unit configured to obtain the calibration data from the transmission path of a signal processing path from the plurality of signal processing paths; or
a receiver calibration unit configured to obtain the calibration data from the receiver path of a signal processing path from the plurality of signal processing paths.

14. The system of claim 13, further comprising a calibration device having a receiver path, the transmission calibration unit configured to obtain the calibration data from the transmission path of the signal processing path from the plurality of signal processing paths by:
(i) sending a reference calibration signal through the transmission path;
(ii) looping the reference calibration signal to the receiver path of the calibration device;
(iii) receiving the reference calibration signal from the calibration device; and
(iv) storing the received reference calibration signal as the calibration data.

15. The system of claim 13, further comprising a calibration device having a transmitter path, the receiver calibration unit configured to obtain the calibration data from the receiver path of the signal processing path from the plurality of signal processing paths by:
(i) sending a reference calibration signal through the transmitter path of the calibration device;
(ii) looping the reference calibration signal to the receiver path;
(iii) receiving the reference calibration signal from the signal processing path from the plurality of signal processing paths; and
(iv) storing the received reference calibration signal as the calibration data.

16. The system of claim 10, further comprising:
a beamforming weight determination unit configured to determine a beamforming weight for a transmission device from the plurality of transmission devices by multiplying an ideal beamforming weight by a calibration weight from the plurality of calibration weights for that transmission device from the plurality of transmission devices, the beamforming weight determination unit configured to apply the beamforming weight for that transmission device from the plurality of transmission devices to a signal processing path from the plurality of signal processing paths associated with that transmission device from the plurality of transmission devices.

17. A system, comprising:
a calibration unit configured to obtain calibration data for each transmission device from a plurality of transmission devices associated with a plurality of signal processing devices;
a calibration weight determination unit configured to determine a plurality of calibration weights from the calibration data;
a signal-to-noise calculation unit configured to calculate, for each signal processing path from the plurality of signal processing paths, a signal-to-noise ratio of the calibration data;
a signal-to-DC calculation unit configured to calculate, for each signal processing path from the plurality of signal processing paths, a signal-to-DC ratio of the calibration data;
a reference transmission device configured to store a reference transmission signal;
a variance calculation unit configured to calculate a calibration variance between the plurality of calibration weights, and configured to calculate a phase variation and a magnitude variation for the calibration data for each transmission device from the plurality of transmission devices with respect to the reference transmission signal;
a threshold determination unit configured to determine if the calibration variance is below a calibration variance threshold, and configured to determine if the phase variation for a signal processing path from the plurality of signal processing paths is below a phase variation threshold, if the magnitude variation for the signal processing path is below a magnitude variation threshold, if the signal-to-noise ratio is below a signal-to-noise ratio threshold for the signal processing path, and if the signal-to-DC ratio is below a signal-to-DC ratio threshold for the signal processing path
if the signal-to-noise ratio of the calibration data for any signal processing path from the plurality of signal processing paths is below the signal-to-noise ratio threshold or if the signal-to-DC ratio of the calibration data for any signal processing path from the plurality of signal processing paths is below the signal-to-DC ratio threshold, then discarding the calibration data, and obtaining new calibration data for each transmission device from the plurality of transmission devices; and
a calibration weight application unit configured to apply a calibration weight from the plurality of calibration weights to the signal processing path from the plurality of signal processing paths if the calibration variance is below the calibration variance threshold, the phase variation for the signal processing path is below the phase variation threshold and the magnitude variation for the signal processing path is below the magnitude variation threshold.

18. A non-transitory computer readable storage medium having a program stored thereon that when executed causes a computer to perform a method, comprising:
obtaining calibration data for each transmission device from a plurality of transmission devices associated with a plurality of signal processing paths;
determining a plurality of calibration weights from the calibration data;
calculating a calibration variance between the plurality of calibration weights and determining if the calibration variance is below a calibration variance threshold;
calculating a phase variation and a magnitude variation from the calibration data with respect to a reference transmission signal obtained from a reference transmission device for each signal processing path from the plurality of signal processing paths;
determining if the phase variation is below a phase variation threshold and if the magnitude variation is below a magnitude variation threshold for each signal processing path from the plurality of signal processing paths; and
applying a calibration weight from the plurality of calibration weights to a signal processing path from the plurality of signal processing paths when the calibration variance is below the calibration variance threshold, the phase variation associated with that signal processing path is below the phase variation threshold and the magnitude variation associated with that signal processing path is below the magnitude variation threshold.

19. The non-transitory computer readable storage medium of claim 18, further comprising:
calculating, for each signal processing path from the plurality of signal processing paths, a signal-to-noise ratio of the calibration data; and
determining if the signal-to-noise ratio of the calibration data is below a signal-to-noise ratio threshold for each signal processing path from the plurality of signal processing paths,
if the signal-to-noise ratio of the calibration data for any signal processing path from the plurality of signal processing paths is below the signal-to-noise ratio threshold then discarding the calibration data, and obtaining new calibration data for each transmission device from the plurality of transmission devices.

20. The non-transitory computer readable storage medium of claim 18, further comprising:
calculating, for each signal processing path from the plurality of signal processing paths, a signal-to-DC ratio of the calibration data; and
determining if the signal-to-DC ratio of the calibration data is below a signal-to-DC ratio threshold for each signal processing path from the plurality of signal processing paths,
if the signal-to-DC ratio of the calibration data for any signal processing path from the plurality of signal processing paths is below the signal-to-DC ratio threshold then discarding the calibration data, and obtaining new calibration data for each transmission device from the plurality of transmission devices.

21. The non-transitory computer readable storage medium of claim 18, wherein the obtaining of the calibration data includes:
obtaining the calibration data from a transmission path associated with a signal processing path from the plurality of signal processing paths; or
obtaining the calibration data from a receiver path associated with a signal processing path from the plurality of signal processing paths.

22. The non-transitory computer readable storage medium of claim 21, wherein the obtaining of the calibration data from the transmission path includes:
(i) sending a reference calibration signal through the transmission path;
(ii) looping the reference calibration signal to a receiver path of a calibration device;

(iii) receiving the reference calibration signal from the calibration device; and
(iv) storing the received reference calibration signal as the calibration data.

23. The non-transitory computer readable storage medium of claim 21, wherein the obtaining of the calibration data from the receiver path includes:
(i) sending a reference calibration signal through a transmitter path of a calibration device;
(ii) looping the reference calibration signal to the receiver path;
(iii) receiving the reference calibration signal from the signal processing path from the plurality of signal processing paths; and
(iv) storing the received reference calibration signal as the calibration data.

24. The non-transitory computer readable storage medium of claim 18, further comprising:
determining a beamforming weight for a transmission device from the plurality of transmission devices by multiplying an ideal beamforming weight by a calibration weight from the plurality of calibration weights for that transmission device from the plurality of transmission devices; and
applying the beamforming weight for that transmission device from the plurality of transmission devices to a signal processing path from the plurality of signal processing paths associated with that transmission device from the plurality of transmission devices.

25. The non-transitory computer readable storage medium of claim 18, wherein a transmission device from the plurality of transmission devices is set as the reference transmission device.

26. A non-transitory computer readable storage medium having a program stored thereon that when executed causes a computer to perform a method, comprising:
obtaining calibration data for each transmission device from a plurality of transmission devices, each transmission device from the plurality of transmission devices being associated with at least one signal processing path;
calculating a signal-to-noise ratio of the calibration data for the at least one signal processing path for each transmission device from the plurality of transmission devices, and determining if the signal-to-noise ratio of the calibration data is below a signal-to-noise ratio threshold for the at least one signal processing path for each transmission device from the plurality of transmission devices;
calculating a signal-to-DC ratio of the calibration data for the at least one signal processing path for each transmission device from the plurality of transmission devices, and determining if the signal-to-DC ratio of the calibration data is below a signal-to-DC ratio threshold for the at least one signal processing path for each transmission device from the plurality of transmission devices;
determining a plurality of calibration weights from the calibration data;
calculating a calibration variance between the plurality of calibration weights and determining if the calibration variance is below a calibration variance threshold;
calculating a phase variation and a magnitude variation from the calibration data for the at least one signal processing path for each transmission device from the plurality of transmission devices with respect to a reference transmission signal obtained from a reference transmission device; and
determining if the phase variation is below a phase variation threshold and if the magnitude variation is below a magnitude variation threshold for the at least one signal processing path for each transmission device from the plurality of transmission devices,
discarding the calibration data and obtaining new calibration data for the at least one signal processing path for each transmission device from the plurality of transmission devices if the signal-to-noise ratio of the calibration data for the at least one signal processing path for any of the plurality of transmission devices is below the signal-to-noise ratio threshold or if the signal-to-DC ratio of the calibration data for the at least one signal processing path for any of the plurality of transmission devices is below the signal-to-DC ratio threshold; and
applying a calibration weight from the plurality of calibration weights to the at least one signal processing path for a transmission device from the plurality of transmission devices if the calibration variance is below the calibration variance threshold, the phase variation for the at least one signal processing path for that transmission device is below the phase variation threshold and the magnitude variation for the at least one signal processing path for that transmission device is below the magnitude variation threshold.

* * * * *

UNITED STATES PATENT AND TRADEMARK OFFICE
CERTIFICATE OF CORRECTION

PATENT NO. : 8,219,035 B2  Page 1 of 1
APPLICATION NO. : 12/562378
DATED : July 10, 2012
INVENTOR(S) : Richard Glenn Kusyk It is certified that error appears in the above-identified patent and that said Letters Patent is hereby corrected as shown below:

Column 11, line 65, change "the calibration data, the calibration data," to --the calibration data,--; and Column 12, line 12, after "path" insert --from--.

Signed and Sealed this
Twenty-eighth Day of August, 2012

David J. Kappos
*Director of the United States Patent and Trademark Office*